2,710,248
PROCESS OF FORMING HYDRAZINE

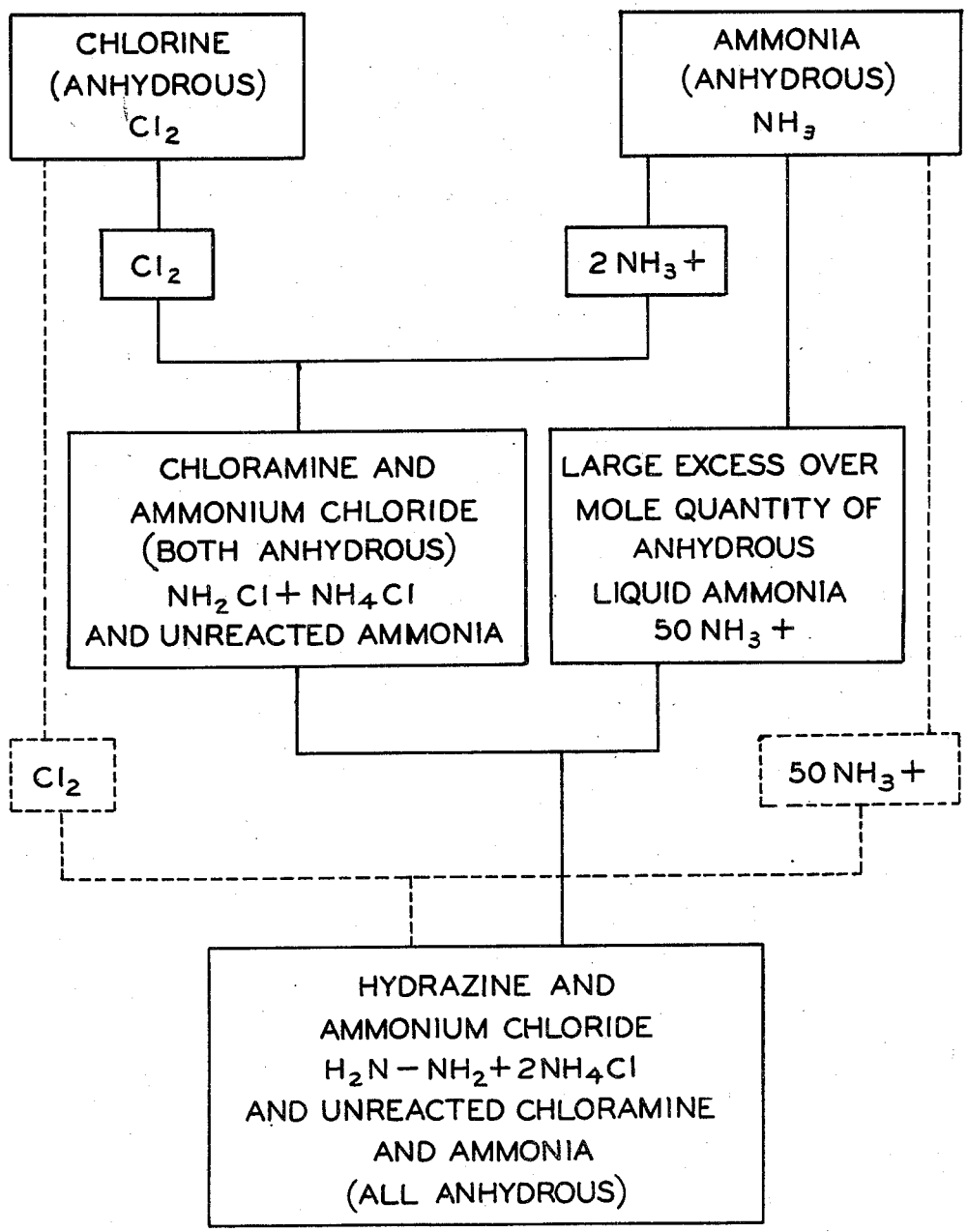

Harry H. Sisler and Robert Mattair, Columbus, Ohio, assignors to The Ohio State University Research Foundation, Columbus, Ohio, a corporation of Ohio Application January 17, 1950, Serial No. 139,098

6 Claims. (Cl. 23—190)

The invention disclosed in this application relates to new methods for the preparation of hydrazine; and incidentally a new method for the preparation of the intermediate product chloramine.

This application is in part a continuation of our copending application Serial No. 110,072, filed August 13, 1949, now abandoned.

Heretofore, hydrazine has been prepared commercially only by the action of a metal hypochlorite (such as sodium hypochlorite) upon aqueous ammonia (or urea). This commercial synthesis is understood to involve first the formation of monochloramine by reaction of the sodium hypochlorite and an aqueous ammonia or an aqueous urea solution; and the subsequent reaction of additional quantities of ammonia still in the solution with the monochloramine. Hydrazine has also been synthesized experimentally (1) by the reduction of compounds containing a nitrogen-nitrogen linkage, (2) by the decomposition of ammonia, and (3) by miscellaneous methods, including other methods of oxidation of ammonia. The yields in processes consisting of the reduction of compounds containing a nitrogen-nitrogen linkage have been very low and in fact have been considered too low to warrant consideration as technical processes. The decomposition of ammonia has been attempted by pyrolysis and by other methods but in such processes, the yields are very small (corresponding in the best production to about 0.25% based on the ammonia which had undergone decomposition). As stated above, hydrazine has been prepared commercially by the reaction of ammonia in aqueous solution with sodium hypochlorite. From such processes there is a good yield, but other oxidation procedures have yielded only very small quantities of hydrazine and such processes are not commercial.

In the oxidation of ammonia through sodium hypochlorite it is believed as stated above, that there is first formed chloramine and sodium hydroxide. The addition of excess ammonia forms hydrazine, sodium chloride, and water. This reaction is a slow one and competes with a third reaction which converts the hydrazine by reaction with the chloramine into ammonium chloride ($NH_4Cl$) and nitrogen. This third reaction effectively cuts down yields of hydrazine.

It has furthermore been stated in the literature that alkali is necessary in order to cause conversion of chloramine by ammonia into hydrazine. We have proved that this is not true. Also in all of the prior art attempts to obtain hydrazine by oxidation of ammonia so far as we know, the ammonia has been used in aqueous solution or a reaction has been involved which forms water, thus inevitably involving an aqueous solution. As stated above, this is definitely true of the commercial process. If the hydrazine is obtained in aqueous solution, it must be dehydrated in order to obtain an anhydrous hydrazine. For many commercial applications anhydrous hydrazine is desirable. Dehydration of hydrazine is a difficult and expensive process. On the other hand, if hydrazine is obtained from the synthesis as an anhydrous product, the dehydration step is obviated.

We have found that by the use of substantially anhydrous ammonia and chlorine, hydrazine may be formed in substantial quantities by chemical reaction of ammonia with chlorine itself to form chloramine and then to form hydrazine provided there is more than sufficient ammonia present to convert substantially all of the chlorine into ammonium chloride. Moreover, such hydrazine is anhydrous.

One of the objects of our invention is, therefore, a new and simple process for the efficient production of hydrazine.

A further object of our invention is a process for the preparation of hydrazine by the direct chemical reaction of ammonia and chlorine.

Another object of our invention is the chemical reaction of anhydrous chlorine and anhydrous ammonia to synthesize an anhydrous hydrazine.

A feature of our invention is the utilization of pressure and heat to increase the yields of hydrazine from the interaction of anhydrous chlorine and ammonia.

Further objects and features will be apparent from the subjoined specification and claims when considered in connection with the figure of the drawings which illustrates an embodiment of our novel process.

In the drawings:

The figure illustrates the reactions involved in an embodiment of our invention. The overall reaction is

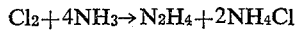

The reaction occurs in two stages as follows:

(1)      $Cl_2 + 2NH_3 \rightarrow NH_2Cl + NH_4Cl$
(2)   $NH_2Cl + NH_4Cl + 2NH_3 \rightarrow N_2H_4 + 2NH_4Cl$

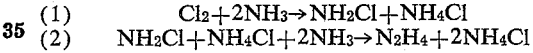

The reaction of Equation 1 is a fast and apparently quantitative reaction. Apparently no hydrazine formation occurs at this point under the conditions under which we worked, but the entire process may be speeded up by operating it under the influence of higher temperature and pressure to yield appreciable amounts of hydrazine in the vapor phase reaction. After the gaseous products of the first step are condensed to the liquid state, hydrazine is formed as shown by the reaction of Equation 2. This reaction is a slower reaction. It runs in competition with side reactions which produce nitrogen rather than hydrazine. The concentration of the chloramine in the liquid mixture in the traps appears to affect greatly the yield of hydrazine. A very large mole ratio of ammonia to chlorine in the liquid phase reaction has a definitely great beneficial effect in increasing the yield of hydrazine. The use of an inert solvent (miscible with liquid ammonia under the given conditions) to dilute the liquid mixture also has a beneficial effect in increasing the yield of hydrazine.

The previously known reactions of chlorine with ammonia are the production of monochloramine, dichloramine, and trichloramine (i. e. nitrogen trichloride), as well as the production of free nitrogen. De Long (1811) by the action of chlorine on an aqueous solution of ammonium chloride obtained nitrogen trichloride as a yellow oily liquid which was violently explosive. He lost an eye and three fingers in the research. It may be presumed that heretofore workers have been deterred from research on the interaction of anhydrous ammonia and chlorine because of the expected vigor of the reaction and the dangers attendant upon the formation of nitrogen trichloride. We have found that if we provide a large excess of ammonia we can avoid the formation of nitrogen trichloride. We have found that by the reaction of substantially anhydrous chloride with an excess of substantially anhydrous ammonia we can obtain hydrazine in yields as high as 30% of theoretical based upon the chlorine in the overall reaction. We believe that we can improve this yield under more favorable conditions. The hydrazine which we produce is anhydrous. We can bubble gaseous chlorine into liquid ammonia and secure the desired reaction. We can dissolve chlorine in a non-aqueous solvent and add such solution to liquid ammonia or to a non-aqueous solution thereof. We can mix gaseous chlorine, nitrogen and ammonia under pressures above atmospheric and at temperatures above room temperature (as for example up to 150° C. or higher) in a pressurized chamber. After reaction the mixtures can in each case be led from the reaction chamber through a series of traps but such treatment is hardly necessary where the reaction is in liquid ammonia. We can mix gaseous chlorine with an inert gas such as nitrogen and then bring these gases into contact with gaseous ammonia to form chloramine. The chloramine so formed can be fed into liquid ammonia to form hydrazine.

We have found that when we mix chlorine gas which has been diluted with nitrogen gas with a large excess of ammonia gas and the resulting gaseous mixture is condensed to the liquid state in traps and the resulting liquid is allowed to stand and then the excess of ammonia is allowed to evaporate, a solid mixture which contains hydrazine is obtained. We have further found that the larger the mole ratio of ammonia to chlorine within reasonable limits, the greater the yield of hydrazine. Specifically we have found that with mole ratios of less than 50 to 1, though hydrazine may be obtained, the yield is relatively small, but at mole ratios of the order of magnitude of 350 to 1, yields of hydrazine as high as 30% based on total chlorine supplied can be obtained. We have found that the effect of the ammonia-chlorine ratio on the yield of hydrazine is operative chiefly in the condensation traps rather than in the gas reaction tube. In other words, the reaction in the gas tube is not particularly sensitive to the ammonia-chlorine ratio as long as a sufficient excess of ammonia to avoid nitrogen trichloride or dichloramine formation is present. The reaction in the trap, however, is very sensitive to this ratio.

The anhydrous hydrazine may be recovered from the reaction products mixture by any one of several methods. The mixture may consist of hydrazine and ammonium chloride. There may also be present unreacted ammonia and monochloramine. Monochloramine will react with ammonia to produce either ammonium chloride and nitrogen or hydrazine and ammonium chloride. The wide separation in the boiling points of nitrogen (−195° C.), ammonia (−33° C.) and hydrazine (113° C.) with ammonium chloride remaining solid until about 350° C. makes separation either by ordinary fractional distillation or by azeotropic distillation possible. Also in the laboratory the unreacted ammonia and the nitrogen may be evaporated at atmospheric pressure and at room temperature, the residue dissolved in water and acidified and then reacted with an aldehyde to form a hydrazine derivative, and thus recovered. Any suitable acid may be used, but we have used sulfuric acid because of its ready availability. Also, we have used benzaldehyde to form a derivative because of the comparatively easy identification of benzalazine.

The finely divided ammonium chloride may, if desired, be removed from the vapor mechanically, preferably before evaporation of the ammonia, as for example, by electrical precipitation before the gases leave the reaction outlet tubes.

We have found that the yield of hydrazine formed by the reaction of ammonia and chlorine can be improved by subjecting the mixture of products to heat (up to about 150° C.) and pressure in pressure equipment.

We have found that by passing the mixed products from the reaction of gaseous chlorine with a large excess of ammonia through a glass wool plug, the ammonium chloride produced in reaction of Equation 1 can be almost completely removed, leaving an anhydrous gaseous mixture of ammonia, chloramine and nitrogen. This mixture can be used as a source of dry chloramine either for the preparation of hydrazine or for a variety of other synthetic chemical reactions. Furthermore, we have been able to absorb the chloramine in dry ether and thus to obtain a dry ethereal solution of chloramine which contains only small concentrations of ammonia.

We have further found that whenever dry chloramine from whatever source derived, is passed into a large excess of liquid ammonia and the solution is allowed to stand, there will be an efficient production of a relatively large quantity of hydrazine.

We prefer that the gaseous product of the reaction of chlorine and ammonia from which solid ammonium chloride may have been removed or may not, should not be cooled suddenly prior to the entry of this product into the liquid ammonia. We have made observations which indicate that the cooling of this gaseous product ($NH_2Cl + NH_3$) may promote the formation of ammonium chloride and nitrogen rather than hydrazine. This is a yield-reducing reaction and decreases the production of hydrazine. Therefore, for this and other reasons, we prefer to introduce gaseous reaction products into the liquid ammonia as rapidly and with as little previous cooling thereof as may be possible.

As stated above, we can dissolve chlorine in a non-aqueous solvent and add such solution to liquid ammonia or a non-aqueous solution thereof. We prefer, in such cases, to choose a solvent which is miscible with liquid ammonia under the conditions of the reaction and which is inert both to the chlorine and the liquid ammonia. In such case, we prefer that the solution of chlorine in the inert solvent be mixed thoroughly with the liquid ammonia and allowed to stand for a sufficient length of time to allow the complete reaction of the chlorine with the ammonia.

This we have discovered that anhydrous hydrazine may be prepared by mixing elementary chlorine (substantially anhydrous and either gaseous or dissolved in an inert solvent such as carbon tetrachloride) with either liquid or gaseous ammonia (also substantially anhydrous). The yields of hydrazine based upon the chlorine used and the following equation

$$Cl_2 + 4NH_3 \rightarrow NH_2NH_2 + 2NH_4Cl$$

are, as stated above, substantial.

Following are examples of our invention:

Example I

We bubbled gaseous chlorine ($Cl_2$) (previously dried so as to be anhydrous or as nearly so as possible) into a well stirred excess of liquid ammonia (also anhydrous or as nearly so as possible). The chlorine gas was added at temperatures between room temperature (25° C.) and its boiling (liquefying) point (about −34°). The liquid ammonia was at temperatures between its boiling (liquefying) point (about −33° C.) and its freezing point (about −77° C.). Gases leaving the reaction vessel were passed through a series of traps kept at temperatures between −33° C. and −77° C. The hydrazine was recovered from the reaction vessel and the traps as a mixture containing hydrazine, chloramine, ammonium chloride, and unreacted ammonia. The synthesis of the hydrazine was proved by forming the benzaldehyde derivative (benzalazine). We did this by letting the excess ammonia evaporate, dissolving the residues in water, acidifying with 10% sulfuric acid, and adding benzaldehyde. The benzalazine was purified by (1) treatment with sodium hydroxide solution to get rid of any benzoic acid which might have formed by air oxidation of benzaldehyde; (2)

washing with water; (3) recrystallization from ethyl alcohol and water mixture; (4) washing with water; (5) drying in air. The identity of the product with benzalazine was proved by (1) melting point; (2) mixed melting point with an equal amount of known pure benzalazine.

*Example II*

We dissolved chlorine in carbon tetrachloride ($CCl_4$), using 4.6 grams of chlorine to 55 grams of the solvent. We added this solution dropwise into 200 ml. of liquid ammonia ($NH_3$) with good stirring. The temperature of the liquid ammonia was maintained between its boiling point and its freezing point. Both the solution of chlorine in carbon tetrachloride and the liquid ammonia were as nearly anhydrous as possible. There was an excess of liquid ammonia over that required by the equations:

$$Cl_2 + 2NH_3 \rightarrow NH_2Cl + NH_4Cl$$
$$NH_2Cl + 2NH_3 \rightarrow N_2H_4 + NH_4Cl$$

(overall) $\quad Cl_2 + 4NH_3 \rightarrow N_2H_4 + 2NH_4Cl$

The temperature of the solution of chlorine was maintained in a range from room temperature (25° C.) to the freezing point of the solution. The concentration of the solution was about 5 g. chlorine in 60 grams of solution. Gases leaving the reaction vessel were passed through a series of cooled traps kept at temperatures between —33° C. and —77° C. The hydrazine was recovered from the reaction vessel and the traps in a mixture containing hydrazine and ammonium chloride. The formation of the hydrazine was proved by forming the benzaldehyde derivative, benzalazine, by letting the excess ammonia evaporate, adding water to the residues, separating off the carbon tetrachloride, extracting it twice with dilute sulfuric acid, adding these water extracts to the other water layer, acidifying this water solution with dilute sulfuric acid, and adding benzaldehyde. The benzalazine was purified and identified in the same manner as explained in Example I.

*Eaxmple III*

We obtained gaseous chlorine as nearly anhydrous as possible. We mixed the chlorine with nitrogen (mole ratio $N_2$ to $Cl_2$ equals 17 to 1) also as nearly anhydrous as possible, and then brought this mixture into contact with gaseous ammonia (also as nearly anhydrous as possible) (mole ratio $NH_3$ to $Cl_2$ equals 267 to 1). This mole ratio of ammonia to chlorine of 267 to 1 provided an excess of gaseous $NH_3$ over that required by the equations:

$$Cl_2 + 2NH_3 \rightarrow NH_2Cl + NH_4Cl$$
$$NH_2Cl + 2NH_3 \rightarrow N_2H_4 + NH_4Cl$$

(overall) $\quad Cl_2 + 4NH_3 \rightarrow N_2H_4 + 2NH_4Cl$

The gases leaving the reaction tube were led through a series of traps kept at temperatures between —33° C. and —77° C. The incoming gases were passed from tanks through drying agents, and into the reaction tube. The flow of incoming gases was continuous, so that there was a continuous stream of gases in the reaction tube, fresh gases coming in at one end forcing the products of the reaction through the other end and through the traps. The end of the last trap was open to the atmosphere. The condensate from the traps was a mixture containing hydrazine, ammonia chloramine, and ammonium chloride. In order to prove the synthesis of hydrazine the mixture was treated by letting the mixture stand for from 12 to 16 hours at from —33° C. to —77° C., then allowing the excess ammonia to evaporate, adding water, acidifying, and adding benzaldehyde. The resulting benzalazine was purified and its identity shown as in Example I. We obtained a yield of about 30% of theoretical.

*Example IV*

We conducted the reaction of gaseous chlorine with gaseous ammonia as described in Example III. Then we combined the contents of all the traps. The combined condensate contained hydrazine, ammonium chloride, monochloramine, and unreacted ammonia. We poured equal amounts into two similar tubes, "A" and "B." After it had stood overnight at —33° to —77°, we allowed the excess ammonia to evaporate from tube "A" and then recovered the hydrazine as benzalazine, purifying and identifying it as in Example I. We subjected the contents of tube "B" to heat (up to 150° C.) and pressure, in pressure equipment, then we cooled to liquid ammonia temperature, let the excess ammonia evaporate, recovered hydrazine as benzalazine, purified and identified it as in Example I. The yield of benzalazine, and therefore of hydrazine, was about three times better from tube "B" than from tube "A."

*Example V*

Anhydrous chlorine vapor, diluted with anhydrous nitrogen, was mixed with anhydrous ammonia vapor and the reaction gas mixture, containing solid, finely divided ammonium chloride was then passed through glass wool plugs that strained substantially all of the ammonium chloride out of the gas mixture. The reaction mixture was then condensed in a series of cooled traps. The molar ratio of ammonia to chlorine was 81 to 1. The yield of hydrazine, recovered as benzalazine, was 5.8% from the first trap. The second and third traps had been previously filled with liquid ammonia to such an extent that any gases passing through them had to bubble through the liquid ammonia. The combined yield from these traps (second and third) was 7.8%. Total yield 13.6%. 53.4% of the chlorine used was recovered from the reaction tube and glass wool, by analysis.

*Example VI*

In another run, designed to be similar to the Example V in all respects, except that in this second run a certain amount of liquid ammonia was placed in the first trap prior to the running of the reaction, the following data were obtained:

Anhydrous chloride vapor, diluted with the same amount of anhydrous nitrogen as in Example V was mixed with anhydrous ammonia vapor and the reaction mixture then passed through glass wool plugs that strained substantially all of the finely divided ammonium chloride out of the gas mixture. The ratio of ammonia to chlorine in the vapor phase reaction was 85 to 1. The reaction mixture was then condensed in a series of cooled traps. Prior to the reaction, there had been placed in the first trap an amount of liquid ammonia such that the total ratio of ammonia to chlorine, counting both the liquid and gaseous ammonia which was later condensed to liquid ammonia, was 365 to 1. The yield of hydrazine, recovered as benzalazine, from the first trap, was 23.7%. The second and third traps had been filled with liquid ammonia, just as in run Example V. The combined yield from the second and third traps was 8.9%. Total yield: 32.7%. 53.0% of the chlorine was recovered from the reaction tube and glass wool, by analysis. Since the condition of the two runs, the amounts of ammonia, nitrogen and chlorine used, were carefully controlled in order that they be as alike as possible, within the limits of experimental control, with the exception that extra ammonia was provided in the first trap, the results indicate that the difference in yields can be attributed directly to the difference in the molar ratios of ammonia to chlorine in the two runs, in the liquid phase.

It is to be understood that the above described embodiments of our invention are for the purpose of illustration only and various changes may be made therein

We claim:

1. A process of preparing substantially anhydrous hydrazine in solution in liquid ammonia which consists of the combination of steps of first introducing substantially anhydrous gaseous chlorine into substantially anhydrous gaseous ammonia in a ratio providing a substantial excess over 2 moles of ammonia to each mole of chlorine to form substantially anhydrous gaseous chloramine and then contacting the substantially anhydrous chloramine thus formed with a large excess over two additional moles of substantially anhydrous liquid ammonia for each mole of chloramine to obtain substantially anhydrous hydrazine in solution in liquid ammonia.

2. A process of preparing substantially anhydrous hydrazine in solution in liquid ammonia which consists of introducing substantially anhydrous gaseous chlorine into a large excess over the equivalent molar quantity of substantially anhydrous gaseous ammonia to form substantially anhydrous chloramine and then condensing the unreacted substantially anhydrous ammonia to the liquid state and contacting the substantially anhydrous chloramine thus formed with the substantially anhydrous liquid ammonia to form substantially anhydrous hydrazine in solution in liquid ammonia.

3. A process of preparing substantially anhydrous hydrazine in solution in liquid ammonia which consists of the combination of steps of first introducing substantially anhydrous gaseous chlorine diluted with an inert gas into substantially anhydrous gaseous ammonia in a ratio providing substantially more than two moles of ammonia to each mole of chlorine to form substantially anhydrous chloramine and then contacting the substantially anhydrous chloramine so formed with a large excess over two additional moles of liquid ammonia for each mole of chloramine to obtain substantially anhydrous hydrazine in solution in liquid ammonia.

4. A process of preparing substantially anhydrous hydrazine in solution in liquid ammonia which consists of introducing substantially anhydrous gaseous chlorine diluted with an inert gas into substantially anhydrous gaseous ammonia in a ratio providing a large excess over 4 moles of ammonia to each mole of chlorine to form substantially anhydrous chloramine and then condensing the unreacted ammonia and contacting the anhydrous chloramine thus formed with the condensed units of the substantially anhydrous ammonia to form substantially anhydrous hydrazine in solution in liquid ammonia.

5. A process for preparing anhydrous hydrazine comprising the steps of first introducing anhydrous gaseous chlorine into anhydrous gaseous ammonia in a ratio providing a substantial excess over two moles of ammonia to each mole of chlorine to form anhydrous gaseous chloramine, and second condensing the resulting mixture of ammonia and chloramine and admixing the mixture with a large excess over two additional moles of anhydrous liquid ammonia for each mole of chloramine to obtain anhydrous hydrazine in solution in said liquid ammonia.

6. The process of preparing anhydrous hydrazine in solution in liquid ammonia which comprises the steps of introducing anhydrous gaseous chlorine into an excess of anhydrous gaseous ammonia above two moles of ammonia per mole of chlorine to form chloramine and admixing the resulting chloramine-ammonia mixture with additional anhydrous liquid ammonia sufficient to provide an excess of more than two moles of ammonia per mole of chloramine, thereby converting the chloramine to anhydrous hydrazine in solution in the excess liquid ammonia.

References Cited in the file of this patent

UNITED STATES PATENTS

| | | |
|---|---|---|
| 910,858 | Raschig | Jan. 26, 1909 |
| 1,480,166 | Joyner | Jan. 8, 1924 |
| 1,581,115 | Harold | Apr. 20, 1926 |
| 1,850,058 | Baker | Mar. 15, 1932 |
| 1,940,592 | Henderson | Dec. 19, 1933 |
| 2,118,904 | Standt et al. | May 31, 1938 |
| 2,155,914 | Von der Lee | Apr. 25, 1939 |

FOREIGN PATENTS

| | | |
|---|---|---|
| 22,957 | Great Britain | 1907 |
| 522,404 | Great Britain | June 17, 1940 |

OTHER REFERENCES

"Hackh's Chem. Dictionary," page 192 (1944 ed.), The Blakiston Co., Philadelphia, Pa.

Ephraim's "Inorganic Chemistry," fourth ed., revised, 1943, page 653. Nordeman Pub. Co., Inc., N. Y.

Mellor's "A Comprehensive Treatise on Inorganic and Theoretical Chem.," vol. 8, page 309. Longmans, Green and Co., N. Y.